May 27, 1930.  R. O. PICKIN  1,760,317
DRILL BIT
Filed March 3, 1927

INVENTOR
R. O. Pickin.

Patented May 27, 1930

1,760,317

UNITED STATES PATENT OFFICE

ROWLAND O. PICKIN, OF LOS ANGELES, CALIFORNIA

DRILL BIT

Application filed March 3, 1927. Serial No. 172,309.

My invention relates to improvements in drill bits of the roller type used for the purpose of drilling wells, such as oil, gas and water wells by the rotary method of drilling.

The principal object of the invention is to provide a drill bit having cutters of the rolling conical type, with a more efficient device for locking the cone upon the bearing.

Another object of the invention is to provide a drill bit having cutters of the rolling conical type with a locking roller positioned and shaped so as to present a square locking shoulder which prevents the cone cutter from being forced out of position upon its bearing.

Another object of the invention is to provide a drill bit of the conical type with a roller locking device that is inserted from within the bearing.

Other objects and advantages of the invention will be apparent from the following description when considered in connection with the accompanying drawing illustrating a preferred embodiment thereof.

On the drawing.

Similar numerals refer to similar parts throughout the several views.

Figure 1:
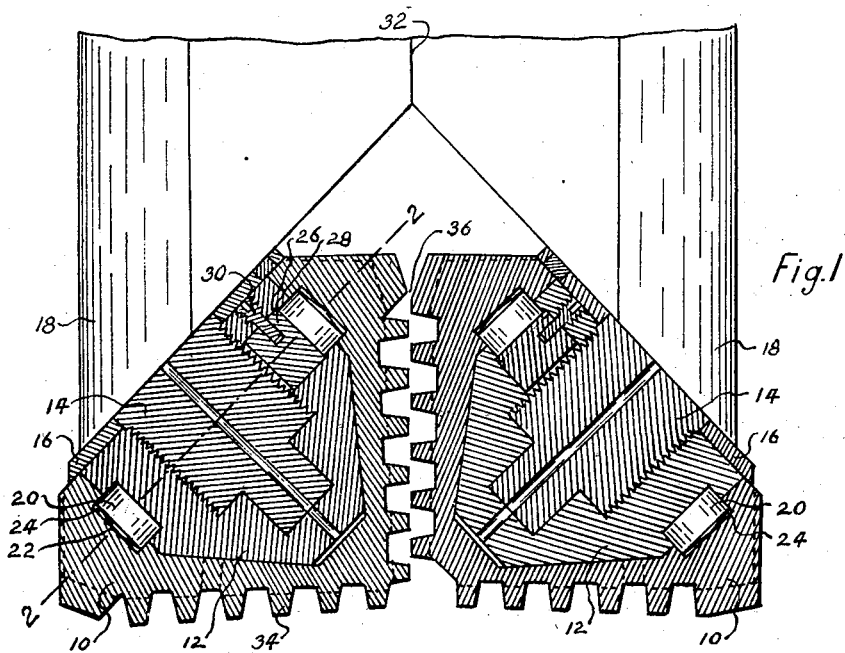
Fig. 1 is a sectional front elevation of the drill bit, showing a pair of conical cutters locked upon the bearings.
Figure 2:
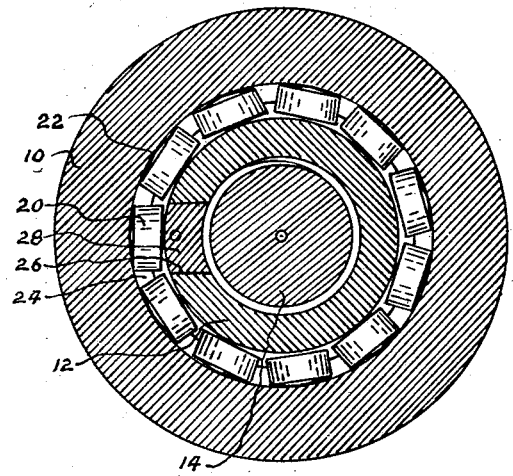
Fig. 2 is a sectional view taken upon the line 2—2, Fig. 1, showing the position of the locking rollers between the cone cutter and the bearing.

The numeral 10, Figs. 1 and 2 indicates the conical shaped cutter which is slidingly mounted upon the bearing 12.

The bearing 12 is threadedly mounted upon the shaft 14 and shouldered against the stationary washer 16, Fig. 1. In this manner the bearing is securely fastened to the head 18, Fig. 1.

Locking rollers 20, Figs. 1 and 2 are positioned between the conical shaped cutter 10 and the bearing 12. These rollers constitute the locking means, as they are placed so as to have approximately one-half their bearing in the cutter 10 and one-half in the bearing 12, the axis of the roller being at right angles to the axis of the shaft, instead of parallel as is the usual practise.

The rollers 20 having their axes at right angles to the axis of the shaft 14, the diameter of the roller is approximately double the width, the outer face 22 of the roller is rounded or conical for the purpose of supporting the roller against the outer wall of the raceway 24.

In assembling, the cutter 10 is placed upon the bearing 12, and the rollers 20 are inserted into the raceway 24 through the aperture 26 which is closed by the block 28, Figs. 1 and 2. This block is locked and secured in place by the set screw 30, Fig. 1. The head 18 being split and separated at 32, Fig. 1, the washer 16 is placed around the shaft 14, and the bearing 12 is screwed upon the shaft. Each half of the drill bit is assembled separately, they are then fastened together ready for operating.

In operation, as the teeth 34 of the cutter 10 roll upon the surface to be cut, the cutter has a tendency to lift at the heel and force the cones down and together at the top, thus closing the space 36, Fig. 1. This is caused by the greater amount of cutting to be done upon the periphery of the hole than at the center.

Should a spherical ball be used as a locking means, there is a great strain set up which easily forces the two halves of a rounded raceway out of alignment, and after slight wear the cones get loose upon the bearing. This defect is eliminated by providing a square shoulder and a cylindrical roller of the kind described and illustrated. And in cases where the locking means has to support an extremely heavy side thrust owing to the wear of the main bearing, the flat sided roller will withstand a greater pressure than a spherical ball, as the latter becomes crushed in the raceway when tons of drill pipe are bearing upon the drill bit.

I claim:

1. A drill bit, provided with an approximately frusto conical shaped rotatable cutter locked upon a bearing by means of rollers inserted in a raceway, said rollers being inserted in said raceway through a hole in said bearing.

2. A drill bit, provided with an approximately frusto conical shaped rotatable cutter locked upon a bearing by means of cylindrical rollers inserted in a raceway, said rollers being inserted in said raceway through an aperture in said bearing, said aperture being closed by a block after said rollers have been inserted.

3. In a drill bit, a rotatable cutter mounted upon an internally threaded bearing and locked thereon by anti-friction locking means located in an annular groove formed partly in the cutter and partly in the bearing, said anti-friction locking means being inserted into said groove through a hole in said bearing and retained therein by a plug inserted in said hole.

4. In a drill bit, an approximately frusto conical shaped cutter rotatably mounted upon and surrounding the end of an internally threaded bearing and locked thereon by anti-friction locking bearings inserted into an annular groove formed partly in said cutter and partly in said bearing, said anti-friction locking bearings being inserted into said groove through a hole connecting the interior of the threaded bearing and the groove, and retained therein by a block inserted into said hole.

5. In a drill bit, an approximately frusto conical shaped cutter rotatably mounted upon and surrounding the end of an internally threaded bearing and locked thereon by anti-friction locking bearings inserted into annular grooves, one groove being formed in the interior of the cutter and the other groove being formed on the exterior of the said bearing, the said grooves being in alignment, said anti-friction locking bearings being inserted into said grooves through a hole in said bearing which connects the interior of the threaded bearing with the groove on the exterior of the said bearing, the said anti-friction bearings being retained in said grooves by a block inserted into said hole, and said block being retained in position by a pin passing through the base of the bearing into the said block.

ROWLAND O. PICKIN.